April 17, 1951     Z. D. RUBEN     2,549,711
AXIAL TYPE FLUID POWER UNIT
Filed May 8, 1948     4 Sheets-Sheet 1
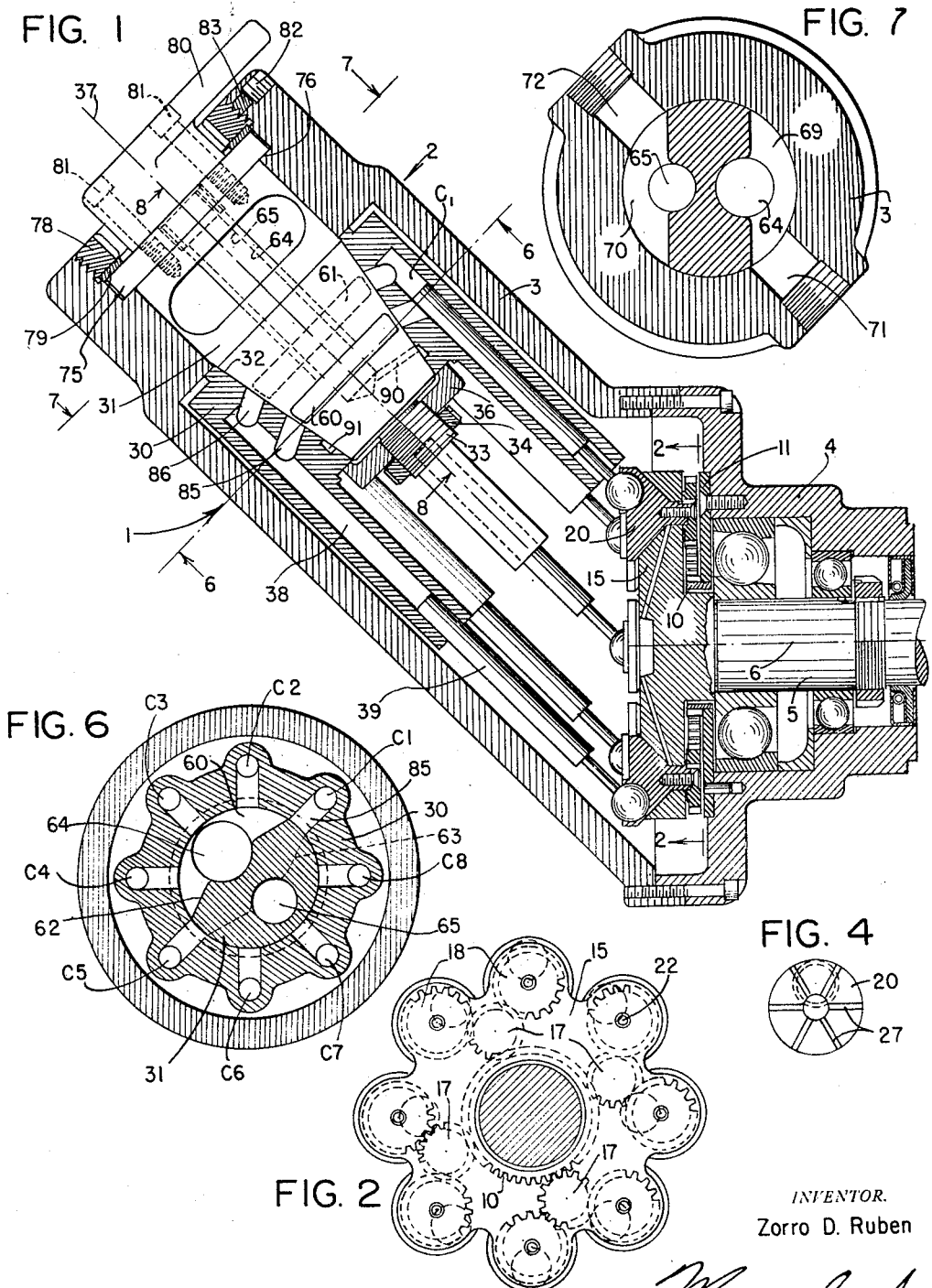
INVENTOR.
Zorro D. Ruben
BY Morris Spector
ATTORNEY

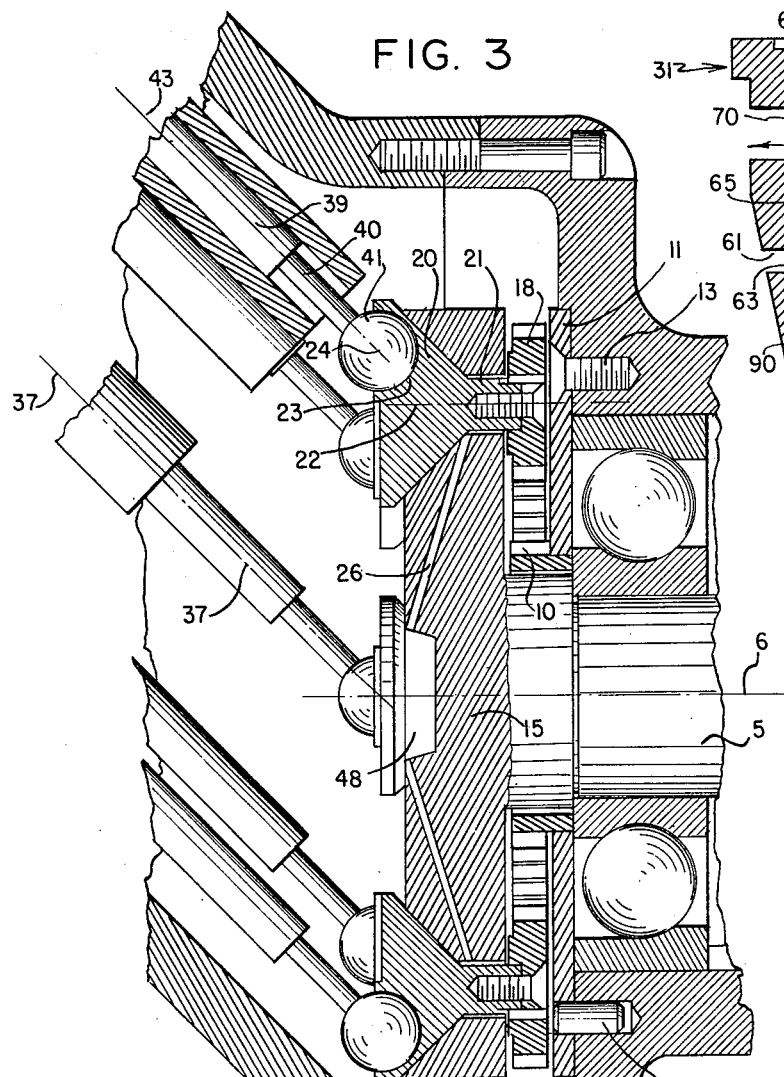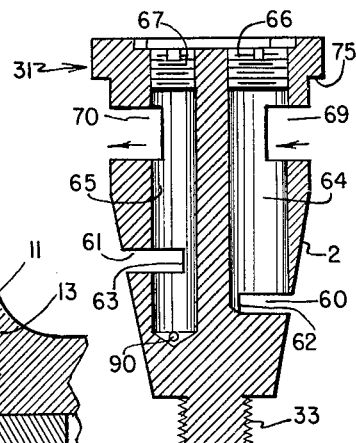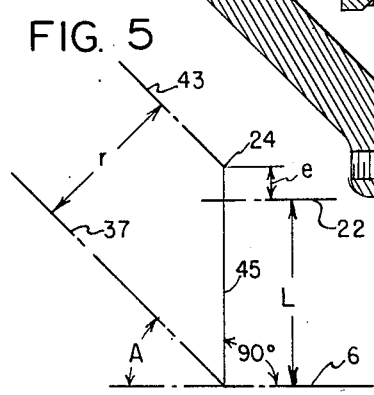

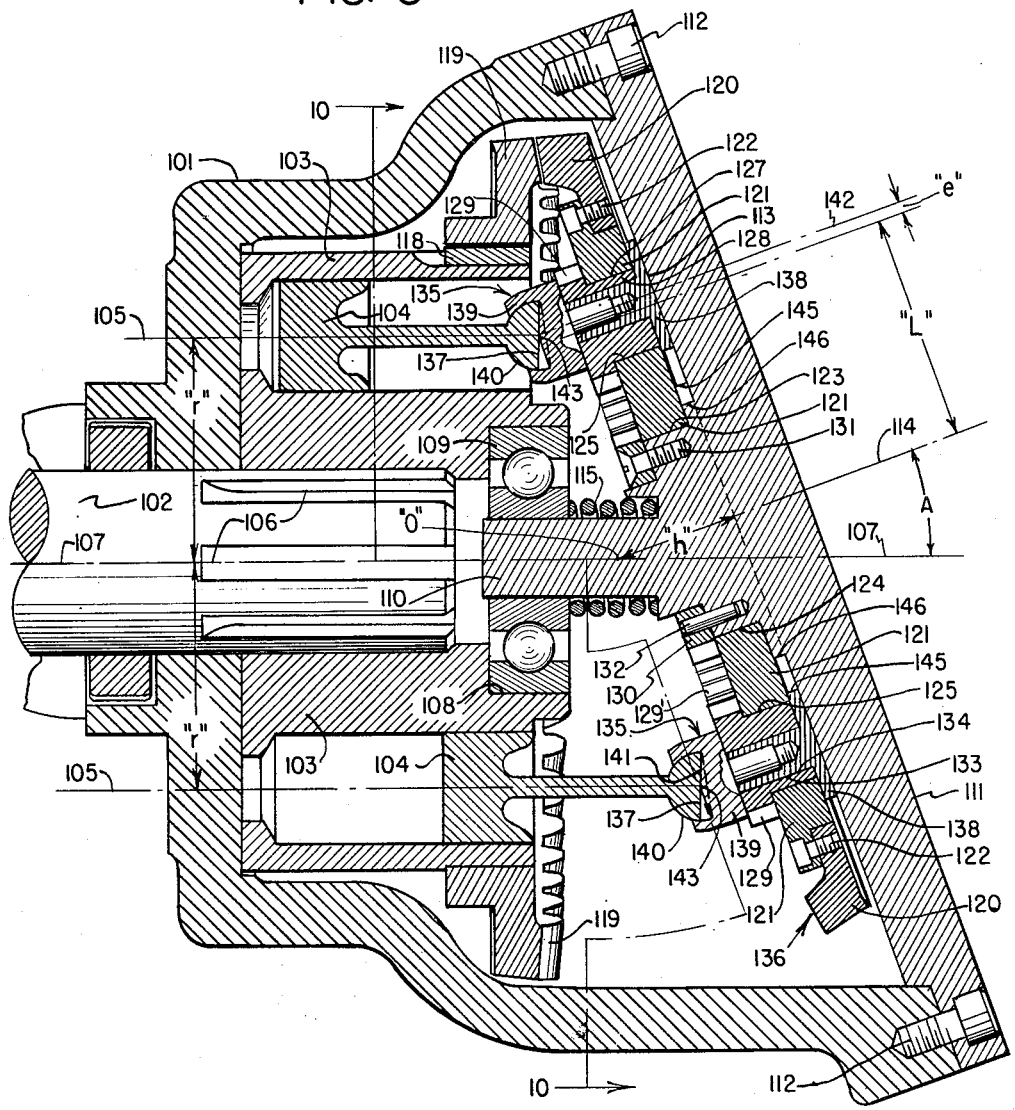

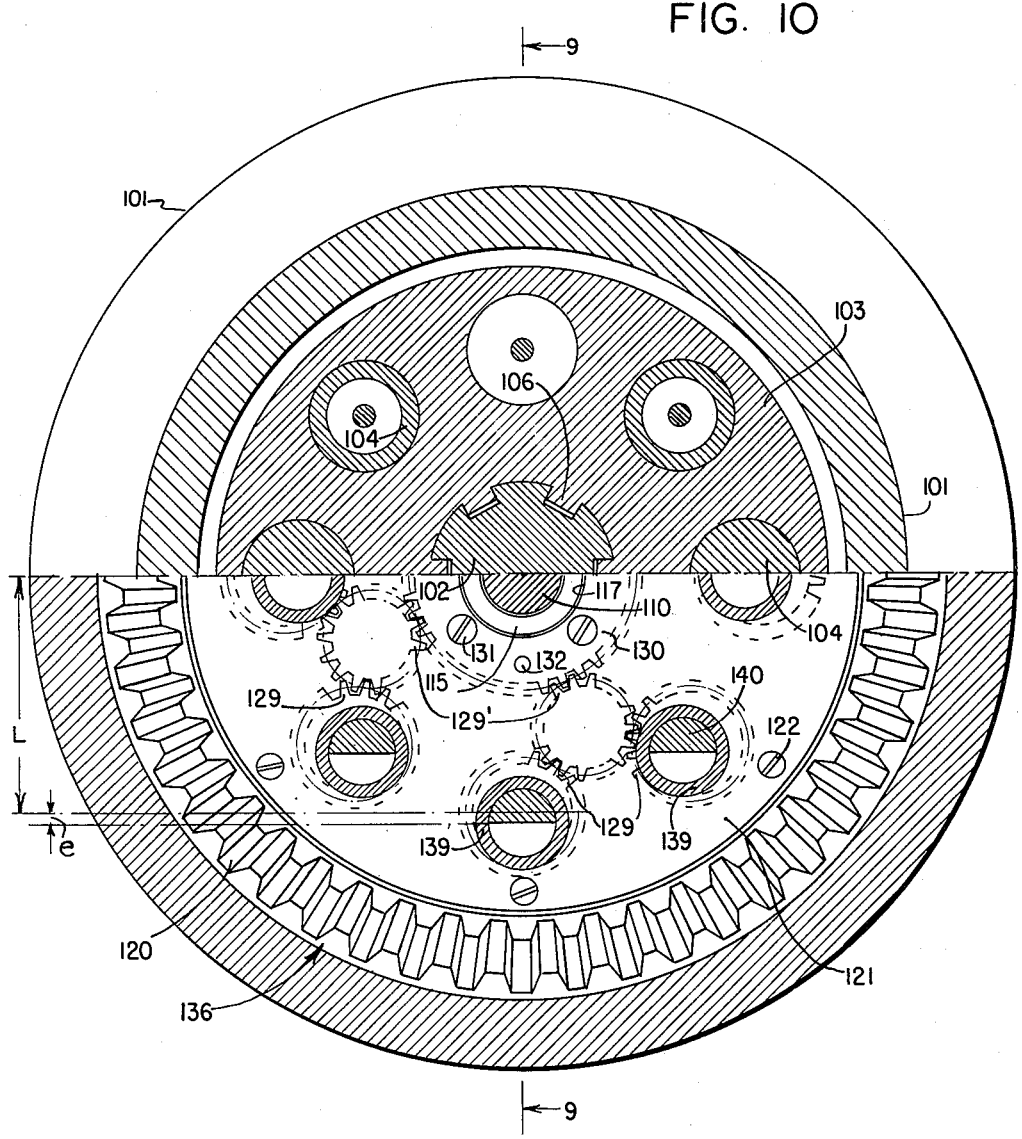

Patented Apr. 17, 1951

2,549,711

UNITED STATES PATENT OFFICE 2,549,711

AXIAL TYPE FLUID POWER UNIT

Zorro D. Ruben, Tucson, Ariz.

Application May 8, 1948, Serial No. 25,943

13 Claims. (Cl. 74—25)

This application is a continuation in part of my copending application Serial No. 681,667, filed July 6, 1946, now abandoned.

The present invention, like the subject matter of my above referred to co-pending application, relates to crankless mechanisms in which power is transmitted between reciprocating and rotating parts. These are often termed "axial" or "axial cam" mechanisms because they include pistons which are arranged with their axes parallel to and spaced around a central axis, and their motion is conveyed to or from an axial cam. The cam may be of the swash plate type or wobble type, or a combination of the two. Advantages of this arrangement include compactness and reduction of weight for a given piston load. Specifically the invention is applicable to mechanisms of motors or pumps for liquids or gases and to heat engines and power transmission machines.

It is an object of the invention to provide a motor and pump mechanism of the axial type in which the thrust reaction on a piston is substantially parallel to and coincident with the piston axis, and to accomplish this without the employment of yoke members that slide back and forth with varying velocity and pressure against a bearing alongside the cylinder. Thus, the cylinder may be exposed for cooling purposes along practically its entire length, and an undesirable type of friction will be avoided.

It is a still further object of the invention to accomplish the above and other improvements with parts involving reduced friction losses and maximum sustaining power for their dimensions. Thus, rolling contact may be provided between bearing parts or thrust and journal bearings, rather than oscillating members. Notably, the universally jointed connecting rod link is eliminated, and a simpler and more durable arrangement is substituted therefor, which also serves to hold the cylinder block and wobbler against continuous rotation with respect to each other without the formerly required universal joint linkage or trunnion support.

It is a still further object of the present invention to provide an axial cam type mechanism for the interconversion of rotary and reciprocating motion which is so constructed as to enable the utilization of a relatively large cam angle. Axial cam mechanisms as heretofore constructed have involved kinematic problems which were compromised by limiting the angle of inclination of the cam. This results in relatively short stroke designs with proportionally high friction losses.

In accordance with the principles of the present invention many heretofore existing kinematic compromises have been eliminated and other structural features introduced to enable the employment of a relatively large cam angle and stroke.

In an axial cam mechanism in which each piston bears directly or indirectly on an inclined surface, the locus of the intersection between the surface and the longitudinal center line of the piston is an ellipse. This has heretofore necessitated the provision of means for transmitting the thrust between a cam surface or wobbler and the piston through some intermediate member which is in slidable relationship to the wobbler or cam and the piston, or to both. The sliding is in amounts and directions required to compensate for the differences between the major and minor axes of the ellipse. I have discovered that it is possible to actuate the center of piston thrust or thrust point on a wobble plate in such a manner that its locus with respect to the wobble plate is a circle and its locus as projected onto a plane at right angles to the piston axes is also a circle which is coincident with the path of travel of the piston axes. When viewed in relation to the axis about which the wobble plate rotates, my new design provides for locating the thrust point on a rotary intermediate bearing member that is mounted on the rotatable wobble plate. The thrust point is eccentric with respect to the intermediate bearing, and the intermediate bearing is rotatable about a center eccentric with respect to the axis of rotation of the wobble plate. These two motions can be so correlated in magnitude and direction that the resulting motion of the thrust point of the intermediate bearing member will be elliptical, the ellipse being coincident with the ellipse that results from the projection of the piston axes onto the wobble plate as the piston axes are rotated.

It is a further object of the present invention to provide an axial cam mechanism of the above mentioned character wherein the bearing surface between the intermediate bearing member and the plate on which it is rotatably mounted is a surface of revolution, preferably a conical surface. The cone thrust bearing has the advantage of reducing frictional loss as it combines the thrust and radial components into one bearing surface.

It is a still further object of the present invention to provide an axial cam mechanism of the above mentioned character with means for assuring continuous lubrication of the bearing surfaces of the intermediate bearing member as the mechanism operates. This result is obtained, in the preferred embodiment of the present invention, by having oil ducts extending to the conical bearing surface from the center of rotation of the wobble plate or other member that supports the intermediate bearing member so that lubricating oil is forced to the conical bearing surfaces by centrifugal action of the mechanism as the mechanism rotates.

It is a still further object of the present invention to provide a pump mechanism of the above mentioned character wherein the piston stroke is maintained constant and the output per stroke is varied by varying the closure and opening of the intake and discharge ports in relation to the positions of the pistons. In the preferred embodiment of the present invention the cylinder block rotates as the pistons reciprocate. The block rotates about an angularly adjustable stationary central member which has passageways formed therein that constitute the intake and outlet ports. These passages come into contact with one or the other of a set of ports on each cylinder bore as the cylinder block is rotated. By changing the angular position of the central member the relationship between the time of opening and closing of the ports and the positions of the pistons is varied to vary the output of the pump. When this same mechanism is used as a hydraulic motor the same adjustment is effective to change the speed of the driving part of the motor.

The attainment of the above and further objects of the present invention will be apparent from the following specification taken in conjunction with the accompanying drawings forming a part thereof.

In the drawings:

Figure 1 is a longitudinal sectional view through an axial type oil pump embodying the present invention;

Figure 2 is a sectional view taken along the line 2—2 of Figure 1 and looking in the direction of the arrows;

Figure 3 is an enlarged sectional view of a portion of Figure 1;

Figure 4 is a fragmentary view showing the oil grooves on the cone surface;

Figure 5 is a diagrammatic view of the center lines of the driving mechanism;

Figure 6 is a sectional view taken along the line 6—6 of Figure 1 and looking in the direction of the arrows;

Figure 7 is a sectional view taken along the line 7—7 of Figure 1 and looking in the direction of the arrows;

Figure 8 is a section taken along the line 8—8 of Figure 1 and looking in the direction of the arrows;

Figure 9 is a longitudinal sectional view illustrating a modified construction; and Figure 10 is a sectional view taken along the line 10—10 of Figure 9 and looking in the direction of the arrows.

Reference may now be had more particularly to the drawings wherein like reference numerals designate like parts throughout.

The structure illustrated in Figure 1 is a high pressure oil pump, although the same structure may constitute a hydraulic motor. The pump is indicated in general by the reference numeral 1 and includes a stationary housing 2, circular in cross section, said housing comprising two parts, indicated at 3 and 4, suitably bolted together. The part 4 may be mounted in any desired manner on a prime mover, or on a driven machine to which the rotatable drive shaft 5 may be connected. Means for ingress and egress of liquid or gases may be of any conventional type, one preferred variable delivery type being here illustrated.

A drive shaft 5 is centered in the housing part 4 as, for instance, by suitable sets of ball bearings, one of which is a thrust bearing for holding the shaft against longitudinal movement. A suitable liquid seal is provided where the drive shaft 5 leaves the housing part 4. The longitudinal center line of the drive shaft is indicated by the center line 6 which is the axis of rotation of the shaft.

A stationary spur gear 10 is centered around the drive shaft 5 and secured to the housing 4 as, for instance, by being brazed to an annular plate 11 that is mounted on the inner face of the housing part 4 by a series of screws or the like 13 and located radially by a dowel pin 12. An eight armed plate 15, which corresponds functionally to a wobble plate, is integral with or secured to the drive shaft 5 and is centered thereon and extends at right angles thereto. Four idler gears 17 are mounted on the plate 15 for rotation about axes fixed with respect to the plate and parallel to the axis of rotation of the drive shaft 5. These idlers are in mesh with the teeth on the spur gear 10, as may be seen from Figure 2, and each idler is in turn also in mesh with a pair of spur gears 18. Each spur gear 18 is of a pitch diameter exactly half of the pitch diameter of the gear 10 so that each spur gear 18 is therefore rotated about its center at an angular speed twice that of the shaft 5.

Each spur gear 18 is keyed to an intermediate bearing member 20 that is rotatably mounted on the plate 15 on the face thereof opposite the face where the gear 18 is located. Each intermediate bearing member 20 has a conical bearing surface that fits into a similar conical shaped opening in the plate 15 for receiving the thrust between the intermediate bearing member and the plate 15. Each intermediate bearing member also has a short stem 21, circular in cross section, that fits through a correspondingly shaped hole in the plate 15 in which the stem 21 is free to turn. The axis of rotation of the intermediate bearing member 20 in the plate 15 is indicated by the center line 22 which is parallel to the axis of rotation 6 of the drive shaft 5. Each intermediate bearing member 20 is provided with a socket 23 of a shape conforming to a portion of the surface of a sphere centered at the point 24. The center 24 is eccentric with respect to the axis of rotation 22 of the intermediate bearing member 20 in the plate 15. The location of this center point 24 and the reason therefor will be more fully set forth as this description proceeds. It is sufficient here to state that the center points 24 of each of the eight intermediate bearing members 20 all lie in the same plane, which is a plane perpendicular to the center line 6, and to state that the center lines 22 of each of the eight intermediate bearing members are at the same distances from the center line 6, and that all of the intermediate bearing members 20 are of exactly the same construction.

The plate 15 has a series of oil ducts 26 therein each leading from the center of the plate member 15 to one of the intermediate bearing members whereby lubricating oil in the housing 2 will be forced by centrifugal action through the ducts 26 for lubricating the bearing surfaces between the respective intermediate bearing members 20 and the plate 15. To facilitate the lubricating action each intermediate bearing member has on the conical surface thereof a series of oil grooves 27, as may be seen from Figure 4. The sides of the oil grooves may be rounded to facilitate formation of a wedge-shaped film of lubricating oil between the conical surface of the intermediate member and the member 15. By providing for the continuous flow of fresh lubricating oil a higher rubbing velocity may be maintained between the intermediate bearing member and the member 15 than would otherwise be possible.

Within the housing part 3 there is mounted a cylinder block 30. The cylinder block is rotatably mounted on a pintle valve 31 that is locked in angularly adjustable position in the housing 3 and includes intake and outlet ports for the cylinders of the cylinder block. The pintle valve 31 has a conical surface 32 over which the cylinder block 30 fits, and has a centrally located threaded shank 33 integral therewith for receiving a threaded cylinder block holding nut 36 that is locked in place by a lock nut 34, to hold the cylinder block against movement axially of the pintle valve 31 while permitting the cylinder block 30 complete freedom of rotation around the pintle valve 31 along the conical surface thereof. The cylinder block 31 is thus rotatable about the pintle valve 31, the axis of rotation being indicated by the line 37. It is to be noted at this point that the axis of rotation 37 intersects the axis of rotation 6 and that the point of intersection lies in the plane determined by the centers 24 of the eight intermediate bearing members.

The cylinder block has eight cylinder bores 38 therein. The longitudinal axes of the respective cylinder bores are all parallel to and uniformly spaced around the longitudinal center line 37. Within each cylinder bore there is an elongated piston 39 that is freely reciprocable therein. Each piston 39 has at its outer end a short stem 40 that terminates in a ball 41, the ball 41 being in turn spun into a ball socket 42 of the intermediate bearing member forming a common ball and socket joint. The stem 40 affords a small amount of flexibility between the piston and the ball 41. As may be seen from Figure 3, the center of the ball 41 necessarily coincides with the center of the socket 22, and the center line of each piston 39, indicated at 43, passes through the center 24 of the ball and socket joint between the piston and the intermediate bearing member.

Rotation of the drive shaft 5 causes the member 15 to rotate, and causes the axis of rotation 22 of the gear 18 to rotate about the center 6. At the same time the gear 18 is rotated about its axis of rotation 22 at an angular speed exactly twice the speed of the shaft 5. This causes the eccentric point 24 to rotate with respect to the plate 15 about the axis 22 and to rotate with the plate about the axis 6. The eccentric point 24 moves in a plane, which is indicated in Figure 5 by the reference numeral 45. All of the respective points 24 move in the same plane.

In view of the fact that the balls of the respective pistons are also centered at 24 and are held in the sockets of the intermediate bearing members, it follows that the centers of the balls 41 will also move in the plane 45. A force will thus be transmitted through the ball and socket connections and the pistons, through the walls of the cylinder bores 38 to the cylinder block 30 causing that block to rotate. Since that block rotates about the axis 37 which is inclined to the axis 6 it follows that the locus of the centers of the balls 41 in the plane 45 must be an ellipse. The minor axis of the ellipse is $2r$, where $r$ is the distance between the center of the ball 41 and the axis of rotation 37. The major axis of the ellipse is $2r$ divided by the cosine of the angle A between the axis 37 and the axis 6.

In order to permit operation of the structure thus far described it is essential that the locus of the center point 24 of the intermediate bearing member as determined by the rotation of the intermediate bearing member 20 by the gear 18 on the rotating plate 15 shall be exactly the same as that of the ellipse above set forth. This result is obtained by adhering to the following relationships, reference being had to Figure 5: The eccentricity $e$ represented by the distance between the center line 22 and the center 24 is made equal to one-fourth the difference between the major axis and the minor axis of the ellipse as set forth above, and L is the distance between the center line 6 and the center line 22. Since $e$ is made equal to ¼ of the difference between the major and minor axes of the ellipse, as set forth above, and since the minor axis of that ellipse is $2r$ and the major axis is $$\frac{2r}{\cos A}$$

it follows that four times $e$ will equal the difference between the two axes, or:

$$1 \quad 4e = \frac{2r}{\cos A} - 2r = \frac{2r(1-\cos A)}{\cos A}$$

$$2 \quad e = \frac{r(1-\cos A)}{2\cos A}$$

also $$3 \quad L = \frac{\text{major axis}}{2} - e = \frac{2r}{2\cos A} - \frac{r(1-\cos A)}{2\cos A}$$

$$4 \quad L = r\left(\frac{1+\cos A}{2\cos A}\right)$$

From the above equations it also follows that $$5 \quad L - e = r\frac{(1+\cos A)}{2\cos A} - \frac{r(1-\cos A)}{2\cos A}$$

$$6 \quad = r\left(\frac{(1+\cos A)-(1-\cos A)}{\cos A}\right)$$

$$7 \quad L - e = r\frac{(2\cos A)}{2\cos A} = r$$

$$8 \quad L = r + e \text{ and } e = L - r$$

From Equation 4 it follows that:

$$9 \quad r = \frac{L(2\cos A)}{1+\cos A}$$

Substituting this value of $r$ in Equation 2 we get:

$$10 \quad e = \left(\frac{L(2\cos A)}{1+\cos A}\right)\left(\frac{1-\cos A}{2\cos A}\right)$$

$$11 \quad e = \frac{L(1-\cos A)}{1+\cos A}$$

In such a structure the eccentric point 24 representing the center of the sphere 23 will describe an ellipse of exactly the same major and minor axes as the ellipse formed by the intersection of the piston center line 43 with the plane 45 as the piston center line 43 is rotated about the cylinder block 37 above set forth.

To bring the two ellipses into coincidence the member 20 is initially positioned so that when its center 24 is in the plane determined by the center lines 6 and 37 the point 24 is also in that plane and at a distance $L+e$ from the axis 6. From this position the trace of the point 24 resulting from the rotation of the member 15 and the intermediate bearing member 20 will coincide with the ellipse formed by the intersection of the center line 43 with the plane 45 as the cylinder block rotates about its axis 37. Rotation of the shaft 5 will result in reciprocation of the piston 39 in the cylinder bores and rotation of the cylinder block about the axis 37.

The cone surface of the intermediate bearing member 20 combines the thrust and radial components with respect to the axis 6 of the pressure between the ball 41 and the socket 23 in one bearing surface. This results in a substantial reduction in the friction loss as compared to the friction losses that would result if the intermediate bearing member were provided with different surfaces which would take, respectively, the thrust and the radial components of the load. During operation of the mechanism the housing 2 contains a mass of lubricating oil to a level above the center line 6 thereof. As the plate 15 rotates it will cause oil to flow by centrifugal action from a central opening 48 therein through the oil ducts 26 to the bearing surfaces between the intermediate bearing member and the plate 15.

The present arrangement as above described makes possible a rotary axial piston pump or motor wherein the angle A between the center line 6 of the plate 15 and the center line 37 of the cylinder block may be of the order of 45°, thus resulting in a large piston stroke, that is, a piston stroke of a length equal to the piston circle diameter. The primary advantage of a large stroke is that there is a greater pump output per revolution of the mechanism and therefore the friction losses per revolution bear a smaller relationship to the total output than would be the case if the output were less.

An explanation will now be given of the valve arrangement of the pump whereby the displacement of the pump may be varied from zero to full load even while the pump is operating. As previously stated, the pintle valve 31 supports the cylinder block at the conical surface 32 thereof which makes a snug sliding fit in the cylinder block. The pintle valve has an intake port 60 and a discharge port 61 each formed by a slot cut into the conical surface. The slot 60 terminates at 62 and the slot 61 terminates at 63, as shown in Figure 8. Intake and discharge passageways 64 and 65 are drilled axially in the pintle valve, their tops being closed by plugs 66 and 67, and they communicate between the ports 60 and 61 and radial ports 69 and 70, respectively. The radial ports 69 and 70 consist of slots formed in the pintle valve, and they communicate with an intake port 71 and a discharge port 72, respectively, which are formed in the casing part 3. The pintle valve includes a flat circular shoulder 75 that is adapted to rest on a shoulder 76 in the housing part 3, and it is held locked in its angularly adjustable position by a take-up nut 78 and a replaceable wear plate 79. A handle 80 is secured to the pintle valve 31, as by a pair of cap screws 81—81, for angularly adjusting the pintle valve. A set screw 82 acts on a plug 83 which fits the threads of the take-up nut and serves to lock the take-up nut in pintle valve holding position.

The cylinder block 30 has intake ports 85 and discharge ports 86 leading to the respective cylinder bores 38. The intake ports 85 communicate with the intake port 60 of the pintle valve during half of each revolution of the cylinder block around the pintle valve, and the discharge ports 86 in the cylinder block communicate with the discharge port 61 through half of the revolution of the cylinder block around the valve. This may be seen from Figure 6. In Figure 6 it is assumed that the cylinder block 30 is rotating counter-clockwise. At this time the intake port 85 of the cylinder bore $C_1$ has just been closed from communication with the discharge port 61 and is about to be brought into communication with the intake port 60 in the pintle valve. At the same time the cylinder bore $C_5$ has just been closed from communication with the intake port 60 and is about to be opened into communication with the discharge port 61 in the pintle valve. At that time the cylinder bores $C_2$, $C_3$ and $C_4$ have their intake ports 85 in communication with the intake port 60 and the cylinder bores $C_6$, $C_7$ and $C_8$ have their intake ports 85 closed from the intake port 60. Those cylinder bores whose intake ports are in communication with the intake port 60 have their discharge ports closed from communication with the discharge port 61, and those cylinder bores whose intake ports are closed from communication with the intake port 60 have their discharge ports 86 in communication with the discharge port 61, except for the two cylinder bores that are momentarily in the position indicated by the cylinder bores $C_1$ and $C_5$ whose ports are closed from communication with either the intake or the discharge ports.

By adjusting the angular position of the handle 80 it is possible to change the timing of the opening and closing of the inlet and discharge ports in relation to the positions of the pistons in the cylinder bores and their directions or movement, thus changing the output of the pump. The net effect will be an interflow of fluid among the cylinders and a reduced external flow. By this means the output of the pump can be reduced to zero by a 90° rotation of the handle.

The cylinder block may be hydraulically balanced on the pintle valve 31 by providing a duct 90 leading from the discharge port 65 to the periphery of the pintle valve where it communicates with an annular groove 91 in the cylinder block.

Reference may now be had to Figures 9 and 10 showing a modified construction. The pump or motor illustrated in Figure 9 comprises a stationary housing 101, circular in cross section, which may be mounted in any desired manner to a prime mover or to a driven machine to which the rotation shaft 102 may be connected. Means for ingress and egress of fluid or gases are not detailed, inasmuch as they can be of any customary construction, such as, for example, that shown in my Patent No. 2,498,451, which is of the ported cover plate type. The shaft 102 is centered in the housing 101 and is keyed to a cylinder block 103 by splines 106. The cylinder block contains a plurality of pistons 104 operating in bores parallel to the shaft 102. The longitudinal center lines of the pistons are indicated by the center lines 105, which are spaced from the axis of rotation 107 of the shaft 102 a distance r as indicated. The cylinder block is provided with a bore 108 housing a radial bearing 109 supported on a short spindle projection 110 of an axial cam 111 which is bolted to the housing 101 by means of bolts 112.

The axial cam 111 is provided with a bearing surface 113 which is perpendicular to a wobbler axis 114. The wobbler axis 114 intersects the shaft axis 107 at a point O a distance $h$ from the bearing surface 113. The wobbler axis 114 and the shaft axis 107 are inclined to each other at an angle A as shown. A helical spring 115 is mounted against a shoulder 117 about the spindle 110 and bears against the bearing 109, which transmits a force to the cylinder block 103, tending to maintain it in pressure contact with the ported end of the housing 101.

It is thus far apparent that the shaft 102 can be used to rotate or be rotated by the cylinder block 103 about the shaft axis 107, which coincides with the axis of the spindle 110. Opposing the cylinder block is a bearing surface 113, making an angle with the shaft axis other than 90°, and with respect to which the cylinder block rotates about the shaft axis. By its relative rotation with respect to the cylinder block, the inclined surface serves as a swash plate type axial cam.

Secured to the cylinder block 103 by a key 118 is a bevel gear 119 rotatable with respect to the shaft axis 107 as is the cylinder block 103, having its cone center or vertex at the point O. The bevel gear 119 engages a like bevel gear 120 having its cone center coinciding with that of the gear 119 at point O and rotatable about the wobbler axis 114. The bevel gear 120 is secured to the wobbler 121 as by screws 122. The wobbler 121 is provided with a central bore 123 providing a radial bearing on a journal section 124 of the cam 111 centered on the wobbler axis 114. Thus the wobbler is free to rotate about the wobbler axis 114, supported by a journal integral with the cam 111, and is keyed, by the engagement of the bevel gears 119 and 120, against rotation with respect to the cylinder block 103.

Radially spaced a distance L from the center of the wobbler bore 123 are circular bearing bores 125 placed in the wobbler with their centers at angular spacings to correspond with that of the pistons in the cylinder block. Bores 125 are designed to act as bearings of journal sections 127 on rotatable bushing sections 128 of gears 129.

Gears 129 are driven by idler gears 129' that are journalled in the wobbler 121 and engage a sun gear 130 secured to the cam 111 by screws 131 and located circumferentially by a pin 132, pressed into the cam 111 as shown in Figure 9. The sun gear 130 is of a pitch diameter twice that of the gears 129, and is provided with twice the number of teeth. It is thus apparent that as the wobbler 121 rotates on the journal 124, the sun gear 130 drives the gears 129 in their bearings 125 at twice the angular shaft velocity.

Each bushing 128 is provided with a bore 133 which is eccentric with respect to the center of the journal 127 in the amount $e$. Bores 133 are designed to receive journal sections 134 of interposed thrust bearing members 135. Thrust bearing members 135 are each interposed between a plane end 137 of a piston and the cam bearing surface 113.

Interposed bearing member 135 is constructed in two parts for convenience in manufacturing and in assembly. The journal section 134 terminates in a slipper 138 which bears against the axial cam surface 113. The journal section 134 is drilled and tapped to receive a retainer 139 which is swaged on the spherical back 140 of the plane piston end 137. Retainers 139 remain with the pistons and are assembled to the journal sections 134 after these have been placed in assembly with the bushings 128, the wobbler 121 and the wobbler journal 124.

Interposed bearing member 135 comprises three essential thrust communication bearing surfaces and one piston return surface.

A cone surface 141 is centered on an axis 142 parallel to the wobbler axis 114. The length of the interposed bearing member 135, along the cone axis 142, from the cone vertex 143 to the axial cam bearing surface 113, is required to equal $h$, which, as previously stated, is the distance along the wobbler axis 114, from its intersection with the shaft axis 107 at point O, to the plane of the axial cam bearing surface 113. The radial distance L, of the center line of bores 125 in the wobbler, to the wobbler axis 114, is required to be equal to $$\frac{r}{2} \frac{(1+\cos A)}{\cos A}$$

The eccentricity $e$ is required to be $L - r$.

The cone axes 142, as shown in Figure 9, intersect the piston axes 105 in a plane passed through the vertex O at right angles to the axis 114. They are maintained in this plane of contact by the rotation imparted to the gears 129 by the sun gear 130 and the eccentricity of the bores 133 in the journals 127. Thus, the cone 141 is maintained in such position on the piston plane end 137 that pure rolling contact thrust transmission takes place. It is evident that the piston reaction is substantially parallel to the piston axis although somewhat off center.

The slipper 138, which is an integral part of the interposed bearing member generally indicated at 135, is an extended bearing surface which preferably approaches the cam bearing surface 113 and is separated therefrom by a wedge shaped clearance space lubricated by an oil film. This may be conveniently accomplished by methods described in my patent application Serial No. 530,416. The face of slipper 138, contacting bearing surface 113, is preferably of a "kidney" shape, to give a maximum bearing area, leaving room for circumferential and radial clearance of the adjacent slippers and parts. It is thus evident that the cam surface 113 exerts a reaction, substantially parallel to the wobbler axis, to the piston thrust. Thus the wobbler 121 must sustain the side thrust resulting from the two opposed forces which are not in the same line. The resultant of all the piston side thrust forces may be resolved into a radial load on the cam journal 124 and a tangential load at the engaging gear teeth of bevel gears 119 and 120.

In operation as a pump in the embodiment shown in Figure 9 and Figure 10, rotation of the shaft 102 causes the cylinder block 103 and the bevel gear 119 affixed thereto to rotate. Bevel gear 119, engaging the like gear 120, of equal number of gear teeth, causes bevel gear 120 to rotate on the journal surface 124 about the wobbler axis 114. Bevel gear 120 being fixed to the wobbler 121, which contains the gear bushing 129 and the interposed bearing member 135 in each bore 125, opposite each piston 104, the entire assembly 136 rotates about the journal 124. A load sustaining bearing between journal 124, and the bore in the wobbler 123 is therefore desirable. This may be either of an ordinary oil film lubricated type or a roller bearing.

The wobbler assembly as described hereinabove, and generally indicated by 136, rotates with respect to the sun gear 130 which is affixed to the stationary cam 111. Thus the gears 129, engaging the pinions 129' which engage the sun gear, and being one-half the pitch diameter in size, and having one-half the number of teeth, rotate about their own centers, at twice the angular velocity of the wobbler assembly about the wobbler axis, and in the opposite direction. The gear bushing 128, having bores 133 therein, eccentric to the journal surfaces 127, which contain the interposed bearings 135, the latter are also given a motion of rotation. They rotate about an axis parallel to the wobbler axis, spaced a distance L therefrom, and in a counter-clockwise direction when the wobbler rotates in a clockwise direction. The combination of these circular motions is such that the cone vertex 143 is stationary with respect to the piston axis 105.

Thus the cone 141 maintains pure rolling contact with the piston plane end 137 as long as there is thrust transmission therebetween and piston 104 is free to rotate at a relatively slow rate in its bore, and slipper 138 is restrained from rotation by contact of its inner edge 145 against the cam shoulder 146. It is apparent that bearings at journals 134 and 127 should also be of the film lubricating or other anti-friction type.

It may also be pointed out that thrust transmission between the bevel gear teeth 119 and 120, due to the pressure angle of the gear teeth, results in a proportional force urging the cylinder block 103 against the ported head of the housing 101 in addition to that of the spring 115.

The slipper 138, which transmits the piston thrust to the cam bearing surface 113, extends beyond the bore 125, and thus serves to withdraw or return the piston 104 on a suction stroke by means of the spherical back 140, enclosed in the swaged retainer 139. Should some other means of piston return be provided, the slipper 138 may be pivoted to the journal 134 of the interposed bearing member 135 in the manner of a Michell pad.

An examination of the structures of Figure 1 and of Figure 9 shows clearly that although the members 15 of Figure 1 and 136 of Figure 9 rotate about an axis at right angles to the members, they are nevertheless wobble plates with respect to their cylinder blocks, because during each revolution of operation of the structure the distances between the outer end of each cylinder bore and the wobble plates progressively increase from a minimum to a maximum and then back to its minimum value, the change being the same in the structure of Figure 1 as in the structure of Figure 9. It is also apparent that while in Figure 9 the rotative power is applied from the cylinder block to the wobble plate, the reverse direction of power transmission prevails in the structure of Figure 1, and that the force required to turn the cylinder block 30 of Figure 1 about the pintle valve 31 is merely that required to overcome the frictional resistance to motion of the cylinder block about the pintle valve. This is of such a small magnitude that that force can readily be transmitted through the pistons and the cylinder bores to the cylinder block. It is also to be noted that in the structure of Figure 9 each piston is connected to its ball socket through a comparatively slender piston rod. In Figure 3 the connection is through the short stem 40. In either event there is sufficient flexibility in the stem 40 or in the slender piston rod to compensate for any mechanical errors, or deviation in the machining operations, so that a very slight discrepancy in the location of any center point 24 of Figure 3 with respect to its associated piston, or discrepancy in the location of the point 143 of Figure 9 in relation to the position of its associated piston, will not prevent operation of the structure.

In compliance with the requirements of the patent statutes I have here shown and described a few preferred embodiments of my invention. It is, however, to be understood that the invention is not limited to the precise constructions here shown, the same being merely illustrative of the principles of the invention. What I consider new and desire to secure by Letters Patent is:

1. A motor or pump mechanism of the axial type comprising an axial cam, a wobbler journalled on said axial cam, a cylinder block containing a plurality of parallel pistons disposed about a common shaft, each of the pistons terminating in a plane surface perpendicular to the piston axis, means for transmitting thrust between each piston and the wobbler, said means comprising separate bearing members interposed between each plane piston end and a curved surface on the wobbler, in each of the separate bearing members one surface having motion with respect to the associated piston and the opposite surface having motion with respect to the wobbler, the first of said motions being a rolling motion and the other motion being a sliding motion, and means to prevent rotation of the wobbler about the shaft with respect to the cylinder block, comprising the engagement of a pair of equal bevel gears, one centered on the shaft axis, the other centered on the wobbler axis, both having vertices at the intersection of said axes, the former being affixed to the cylinder block and the latter to the wobbler.

2. In mechanism, a piston reciprocable within a cylinder block, spaced from, axially parallel and rotatable with respect to a shaft, an axial cam bearing surface perpendicular to a wobbler axis which intersects the shaft axis at a point O, a wobbler with a radial bearing having a bevel gear affixed thereto, both centered on the wobbler axis, said gear engaging an equal gear centered on the shaft axis and affixed to the cylinder block, said gears having common vertices at point O, a member, supported by the wobbler, interposed between the piston and the cam bearing surface, to transmit thrust forces therebetween in such manner that the piston reaction is substantially parallel to the shaft axis, the cam reaction is substantially parallel to the wobbler axis, and the resulting side thrust is sustained by the radial bearing and the engaging gear teeth.

3. In combination, a cylinder block having pistons rotatable about their axes and parallel to a shaft and spaced from the axis thereof a distance $r$, an axial cam having a plane bearing surface perpendicular to a wobbler axis which intersects the shaft axis at an angle A, a distance $h$ from its bearing surface, said axial cam having a rotary motion with respect to the cylinder block, a wobbler rotatably mounted on said wobbler axis, means to prevent rotation of the wobbler with respect to the cylinder block, a bearing member coating with each piston and the axial cam bearing surface having, at the piston end, a surface of revolution centered on an axis parallel to the wobbler axis, which intersects the piston axis at a distance $h$ from the axial cam bearing surface, each said bearing member being supported radially in an eccentric bore in a journal centered in the wobbler on an axis parallel to the wobbler axis and spaced therefrom a distance $$L = \frac{r}{2}\left(\frac{1+\cos A}{\cos A}\right)$$

the amount of the eccentricity being $e=L-r$, and means of rotating each said journal two revolutions for each revolution of the cylinder block with respect to the axial cam so that pure rolling contact thrust transmission occurs between the piston and the bearing coacting with same.

4. In combination a longitudinally reciprocating member, mounting means therefor, rotatable about an axis of rotation parallel to and spaced from the longitudinal axis of the member, a second member rotatable about a second axis of rotation intersecting the first axis and inclined thereto and also inclined to the normal thereto, means establishing a power transmitting connection between the two members including a third member rotatably mounted on the second member for rotation about a third axis of rotation spaced from the second axis of rotation, and means for rotating the third member about the third axis at an angular speed twice that of the second member.

5. In combination a longitudinally reciprocating member, mounting means therefor rotatable about an axis of rotation parallel to and spaced from the longitudinal axis of the member, a second member rotatable about a second axis of rotation intersecting the first axis and inclined thereto and also inclined to the normal thereto, means establishing a power transmitting connection between the two members including a third member rotatably mounted on the second member for rotation about a third axis of rotation spaced from the second axis of rotation, and means for rotating the third member about the third axis at an angular speed twice that of the second member and in a direction opposite to the direction of rotation of the second member, the first and the third members being in thrust transmitting relation to one another and with the center of contact between them located eccentric to the third axis.

6. In combination a longitudinally reciprocating member, mounting means therefor rotatable about an axis of rotation parallel to and spaced from the longitudinal axis of the member, a second member rotatable about a second axis of rotation intersecting the first axis and inclined thereto and also inclined to the normal thereto, means establishing a power transmitting connection between the two members including a third member rotatably mounted on the second member for rotation about a third axis of rotation spaced from the second axis of rotation, and means for rotating the third member about the third axis at an angular speed twice that of of the second member and in a direction opposite to the direction of rotation of the second member, the first and the third members being in thrust transmitting relation to one another and with the center of contact between them located eccentric to the third axis and on a line extending at right angles to the second axis of rotation at the point of intersection of the first and second axes of rotation.

7. In combination a longitudinally reciprocating member, mounting means therefor rotatable about an axis of rotation parallel to and spaced from the longitudinal center of the member, a second member rotatable about a second axis of rotation intersecting the first axis and inclined thereto and also inclined to the normal thereto, means establishing a power transmitting connection between the two members including a third member rotatably mounted on the second member for rotation about a third axis of rotation spaced from the second axis, and means for rotating the third member about the third axis at an angular speed twice that of the second member and in a direction opposite to the direction of rotation of the second member, the first and the third members being in thrust transmitting relation to one another and with the center of contact between them located eccentric to the third axis and on a line extending at right angles to the second axis at the point of intersection of the first and second axes and furthest from the second mentioned axis of rotation at the two positions in the rotation of the third axis about the second axis of rotation when said center of contact intersects the plane determined by the first and the second axes of rotation.

8. In combination a longitudinally reciprocating member, mounting means therefor rotatable about an axis of rotation parallel to and spaced from the longitudinal center line of the member, a second member rotatable about a second axis of rotation intersecting the first axis and inclined thereto and also inclined to the normal thereto, means establishing a power transmitting connection between the two members including a third member rotatably mounted on the second member for rotation about a third axis of rotation spaced from the second axis, and means for rotating the third member about the third axis at an angular speed twice that of the second member and in a direction opposite to the direction of rotation of the second member, the first and the third members being in thrust transmitting relation to one another and with the center of contact between them located eccentric to the third axis and on a line extending at right angles to the second axis at the point of intersection of the first and second axes and furthest from the second mentioned axis of rotation at the two positions in the rotation of the third axis about the second axis of rotation when said center of contact intersects the plane determined by the first and the second axes of rotation, the eccentricity $e$ being $$e = L\left(\frac{1-\cos A}{1+\cos A}\right)$$

where $A$ is the angle between the two first mentioned axes of rotation and $L$ is the distance between the second and third axes of rotation.

9. In combination a longitudinally reciprocating member, mounting means therefor rotatable about an axis of rotation parallel to and spaced from the longitudinal center of the member, a second member rotatable about a second axis of rotation intersecting the first axis and inclined thereto and also inclined to the normal thereto, means establishing a power transmitting connection between the two members including a third member rotatably mounted on the second member for rotation about a third axis of rotation spaced from the second axis, and means for rotating the third member about the third axis, the first and the third members being in thrust transmitting relation to one another and with the center of thrust located eccentric to the third axis, the eccentricity $e$ being $$e = L\left(\frac{1-\cos A}{1+\cos A}\right)$$

where A is the angle between the two first mentioned axes of rotation and L is the distance between the second and third axes of rotation.

10. In combination a longitudinally reciprocating member, mounting means therefor rotatable about an axis of rotation parallel to and spaced from the longitudinal center of the member, a second member rotatable about a second axis of rotation intersecting the first axis and inclined thereto and also inclined to the normal thereto, means establishing a power transmitting connection between the two members including a third member rotatably mounted on the second member for rotation about a third axis of rotation spaced from the second axis, and means for rotating the third member about the third axis at an angular speed twice that of the second member and in a direction opposite to the direction of rotation of the second member, the first and the third members being in thrust transmitting relation to one another and with the center of thrust located eccentric to the third axis, the eccentricity $e$ being $$e = L\left(\frac{1-\cos A}{1+\cos A}\right)$$

where A is the angle between the two first mentioned axes of rotation and L is the distance between the second and third axes of rotation.

11. In combination a longitudinally reciprocating piston, a cylinder block in which the piston reciprocates, means for mounting the cylinder block for rotation about an axis of rotation parallel to and spaced from the longitudinal center of the piston, a first member rotatable about a second axis of rotation intersecting the first axis and inclined thereto and also inclined to the normal thereto, means establishing a power transmitting connection between the piston and the member including a second member rotatably mounted on the first member for rotation about a third axis of rotation spaced from the second axis of rotation and parallel thereto, and means for rotating the second member about the third axis at an angular speed twice that of the second member and in a direction opposite to the direction of rotation of the first member, the piston and the second member being in thrust transmitting relation to one another and with the center of contact between them located eccentric to the third axis and on a line extending at right angles to the second axis of rotation at the point of intersection of the first and second axes of rotation and furthest from the second mentioned axis of rotation at the two positions in the rotation of the third axis about the second axis when said center of contact intersects the plane determined by the first and the second axes of rotation, the eccentricity $e$ being $$e = L\left(\frac{1-\cos A}{1+\cos A}\right)$$

where A is the angle between the two first mentioned axes of rotation and L is the distance between the second and third axes of rotation.

12. In combination, two members mounted for rotation about respective intersecting axes making an acute angle to one another, a bearing mounted on one of the members and receiving the thrust of the other member, the center of thrust being in a plane which is normal to the axis of said one member and which passes through the point of intersection of said axes, and gearing means for rotating said bearing with respect to said one member about an axis eccentric with respect to the center of thrust, the eccentricity $e$ being $$e = L\left(\frac{1-\cos A}{1+\cos A}\right)$$

where A is the acute angle and L is the distance between the axis of rotation of the bearing and the axis of rotation of the member on which the bearing is mounted.

13. Mechanism including a cylinder block having a reciprocable piston therein, a wobble plate, and means for connecting the piston and the wobble plate for the transfer of power from one to the other comprising a bearing member for transmitting the thrust between the piston and the wobble plate, said bearing member being rotatably supported by the wobble plate, and gearing means for rotating the bearing member in the wobble plate at the rate of one revolution per single stroke of the piston.

ZORRO D. RUBEN.

REFERENCES CITED

The following references are of record in the file of this patent:

UNITED STATES PATENTS

| Number | Name | Date |
|---|---|---|
| 577,065 | Pole | Feb. 16, 1897 |
| 646,658 | Frazeur | Apr. 3, 1900 |
| 1,800,929 | Craig | Apr. 14, 1931 |
| 1,842,322 | Hulsebos | Jan. 19, 1932 |
| 2,337,821 | Huber | Dec. 28, 1943 |
| 2,360,762 | Conrad | Oct. 27, 1944 |